Dec. 13, 1966   W. A. BRASTAD   3,291,301
CLASSIFYING APPARATUS AND PROCESS
Filed Oct. 28, 1963

INVENTOR.
WILLIAM A. BRASTAD
BY Robert B. Hughes
ATTORNEY

# United States Patent Office 3,291,301
Patented Dec. 13, 1966

3,291,301
CLASSIFYING APPARATUS AND PROCESS
William A. Brastad, Minneapolis, Minn., assignor to General Mills, Inc., a corporation of Delaware
Filed Oct. 28, 1963, Ser. No. 319,291
18 Claims. (Cl. 209—12)

This invention relates to an apparatus and process for the classification of particulate material, and more particularly to such an apparatus and process as applied to a gravity table by which material such as grain has foreign matter removed therefrom.

It is an object of the present invention to provide an apparatus and process to obtain a "sharper" or more efficient separation of particulate material into separate fractions, one of which is such that in the operation of the apparatus it is more susceptible to electrostatic force than the other, as, for example, is the case in separating foreign matter (e.g. rat pellets) from grain by means of a gravity table, wherein the foreign matter is more susceptible to electrostatic forces than is the grain.

It is a more particular object to provide an improvement for a gravity table, which improvement comprises phased electrostatic means in combination with a barrier to improve the operation of the gravity table so as to obtain a cleaner separation of the foreign matter from the grain.

These and other objects will become apparent from the following description of the preferred embodiment shown in the accompanying drawing, in which.

Figure 1:
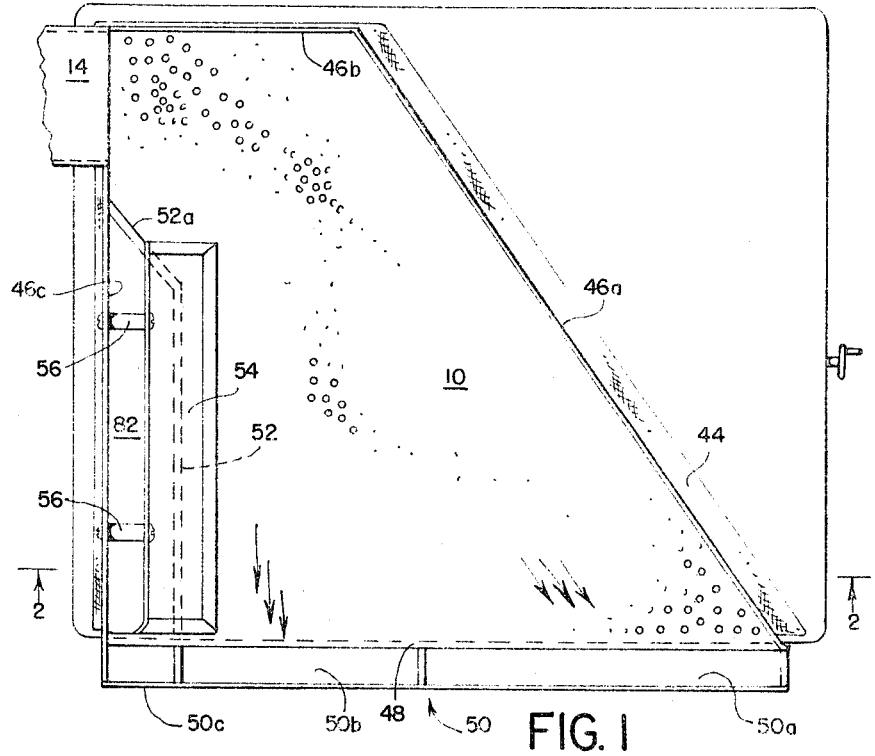
FIGURE 1 is a top plan view of the apparatus of the present invention.

In the accompanying drawing, the present invention is shown in its preferred embodiment as applied to a conventional gravity table of a type commonly used in the flour milling industry. It is believed that a clearer understanding of the novel aspects of the present invention will be obtained by first describing the structure and operation of the components of this conventional gravity table as illustrated, and then describing the components contributed by the present invention and how they interrelate with the components of the prior art gravity table in achieving an improved separation of the material to be classified (which, in the discussion of the present invention, is assumed to be "dirty wheat," which is to have the foreign matter fraction removed therefrom to leave the "clean wheat" fraction. For clarity, the term "wheat material" as used herein will refer to the material to be classified, while the term "wheat" and "foreign matter" refer to, respectively, the clean wheat fraction and the foreign matter fraction.)

In general, the conventional gravity table shown herein comprises a perforate generally planar carrying member 10 having an upwardly disposed carrying surface 12 on which the wheat material to be classified is deposited by suitable feed means, such as the chute indicated at 14, located at one corner of the carrying member 10. This carrying member 10 is mounted for reciprocating motion along a path having a substantial horizontal, longitudinally aligned path component and a moderate vertical path component so that the member 10 moves in a cycle of reciprocation forwardly and upwardly and then downwardly and rearwardly. Such a mounting is conveniently accomplished by supporting the carrying member 10 from front and rear support arms 16 and 18, respectively, each of which is pivotally connected by its upper end at 20 to the carrying member 10 and by its lower end at 22 to a supporting frame 24. The arms 16 and 18 are parallel and generally vertically disposed, but are tilted moderately to the rear so that the aforementioned moderate vertical component is added to the oscillating movement of the carrying member 10.

To reciprocate the carrying member 10, there is provided an electric motor 26 mounted from the base frame 24 and driving through a shaft 27 an eccentric 28 which is connected to the rear end of a drive rod 30, the front end of which is pivotally connected at 32 to a bracket 34 fixed to the carrying member 10. Thus the motor 26 rotates the eccentric 28 to reciprocate the rod 30 and cause the afore-described oscillating motion of the carrying member 10.

Figure 2:
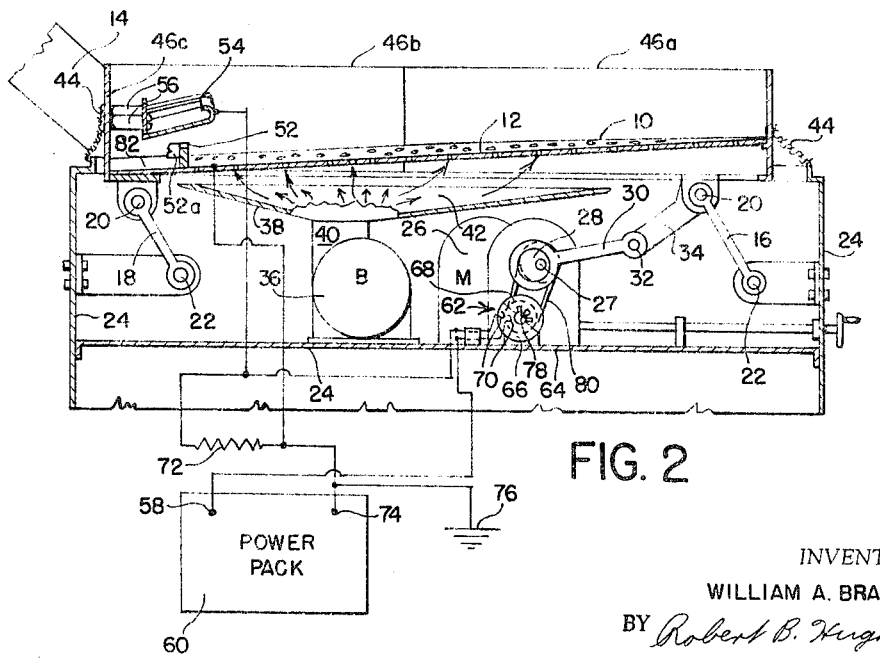
FIGURE 2 is a longitudinal vertical sectional view taken on lines 2—2 of FIGURE 1.

Below the carrying member 10 there is mounted to the base frame 24 a blower, shown schematically at 36, which functions during the operation of the gravity table to move air continuously upwardly through the perforate carrying member 10 and through the wheat material carried thereon. This upward movement of air in conjunction with the oscillating movement of the carrying member 10 tends to separate the wheat material on the carrying member 10 into an upper layer having most of the foreign matter and a lower layer predominately of clean wheat. To illustrate the intended function of the blower (i.e. to direct the air upwardly through the carrying member 10), there is shown in FIGURE 2 a plate member 38 diverging from the mouth 40 of the blower 36 and creating generally a plenum chamber 42 from which the air from the blower 36 moves upwardly through the carrying member 10. So that the air from the blower 36 is directed through the perforate carrying member 10, the carrying frame 24 is made as a substantially closed structure and has its upper edge connected by a peripheral flexible membrane 44 to the carrying member 10.

The carrying surface 12 of the member 10 is sloped rearwardly and also is sloped transversely so that wheat material fed from the feed chute 14 onto the moderately elevated infeed side of the carrying surface 12 will migrate across the carrying surface 12 to the lower outfeed side of the carrying surface 12. The front edge, the left or infeed edge and the rear edge of the carrying member 10 are provided with a continuous upstanding containing wall (the front, side and rear portions of which are designated 46a, b and c, respectively), while the right or outfeed edge 48 of the carrying member 10 has positioned therebelow a plurality of collecting bins generally designated 50 to receive the wheat material as it travels off the outfeed edge 48 of the carrying member 10. For reasons (which will become more apparent from the hereinafter disclosed operation of the apparatus) relating to the manner in which the wheat material from the chute 14 spreads as it progresses across the carrying surface 12, the front wall 46a extends diagonally forward and to the right or outfeed side of the carrying member 10.

The components described thus far are those which exist in a conventional gravity table. In the conventional operation of such a gravity table, wheat material to be classified is fed by means of the chute 14 onto the rear infeed end of the carrying member 10. As before indicated, the reciprocating motion of the carrying member 10 (which causes the wheat material thereon to slide back and forth on the member 10) along with the upward movement of air through the perforate carrying member 10, causes the wheat material to be stratified into an upper layer containing most of the foreign matter, and a lower layer mostly of clean wheat. The fact that the longitudinal reciprocating motion of the carrying member 10 has a vertical component so that it rises on its forward half-cycle of reciprocation and descends on its rearward half-cycle tends to convey the wheat material forwardly along the carrying surface 12 of the member 10.

Acting oppositely to this forward conveying action is the effect of the rearward slope of the surface 12 of the member 10. This, in conjunction with the oscillating motion of the carrying member 10, which causes a back and forth sliding motion of the wheat material with respect to the carrying surface 12, creates a tendency for the wheat material to move along a component of travel in the direction of the rearward slope of the carrying surface 12. By properly selecting the degree of slope of the member 10 in relation to the amplitude, frequency and slant of the oscillating motion of the carrying member 10, the forward conveying motion contributed by the vertical component of the oscillating motion can be made to predominate with the lower clean wheat layer which is proximate the carrying surface 12, while the upper layer of foreign matter slides "downhill" to the rear over the lower clean wheat layer.

Since the carrying surface 12 of the member 10 is also sloped downwardly toward the right or outfeed end thereof, both clean wheat and foreign matter will migrate across the carrying member 10 toward the outfeed edge 48. Since there is imparted to the clean wheat fraction a forward component of travel (due to, as explained hereinbefore, the effect of the vertical component in the oscillating motion predominating, with respect to the clean wheat, over the effect of the rearward slope of the member 10), the resultant path of travel of the clean wheat will be forward and across the carrying surface 12 (as illustrated in FIGURE 1). On the other hand, since the net component of travel longitudinally for the foreign matter is rearward, the foreign matter will travel along the rear portion of the carrying surface 12 to the outfeed edge 48 of the carrying member 10.

One of the problems in prior art gravity tables such as the one described herein is that the foreign matter fraction collected contains an undesirable amount of wheat. Also, in the specific construction of the gravity table shown herein, the action of the back wall 46c has the effect of impacting or disturbing the foreign particles proximate thereto so as to churn the same and cause a mixing of these foreign particles with the grain, thus degrading the sharpness of the separation.

In accordance with the present invention, there is provided a transversely aligned barrier 52 upstanding a short distance above the carrying surface 12 and spaced a moderate distance forward of the rear containing wall 46c. This barrier 52 extends from the outfeed edge 48 of the carrying member 10 transversely to a location proximate the infeed end of the carrying member 10 where it reaches diagonally and rearwardly, as at 52a, to join to the rear containing wall 46c short of the infeed chute 14. This barrier 52 is made of an electrically non-conductive material and reaches upwardly only a moderate distance (i.e. a quarter to a half inch) above the upper level of the wheat material on the carrying surface 12.

Located a short distance above this barrier 52 and extending the length thereof is a generally planar electrically conductive plate or electrode 54, which reaches a moderate distance both forwardly and rearwardly of the barrier 52 and which is mounted by insulating brackets 56 from the rear containing wall 46c.

To establish periodically a potential difference between the carrying member 10, which is made of a conductive material to serve as a lower electrode, and the plate or upper electrode 54, one terminal 58 of a power pack 60 is electrically connected to the upper electrode 54 through a switching device, generally designated 62, which functions to transmit current only during a selected portion (or if desired, portions) of each cycle of reciprocation of the carrying member 10. As shown herein, this device 62 comprises a rotating disc 64, one surface of which is divided generally diametrically into a conducting portion 66 and a non-conducting portion 68. The upper electrode 54 is connected to one of a pair of brushes, indicated schematically at 70, which ride along said surface of the disc 64, and are located on the same radius line thereof. The one terminal 58 of the power pack 60 is connected to the other brush 70 so that the upper electrode 54 makes connection with the terminal 58 on every half-cycle of rotation of the disc 64.

This electrode 54 is connected electrically through a resistance 72 to a second terminal 74 of the power pack 60, which terminal 74 is grounded as at 76. The carrying member 10 is also connected to ground at 76. Thus, when an electrical charge is imparted to the electrode 54 so as to establish a voltage between this upper electrode 54 and the carrying member 10, the charge on the upper electrode 54 will in a short time discharge itself to ground through the resistance 72. It will be noted that the edges of the electrode 54 are turned upwardly to prevent a concentration of charge on the end edges of the electrode 54 from distorting the electrostatic field between the upper electrode 54 and the lower electrode carrying member 10.

By driving the disc 64 from the same motor 26 which reciprocates the carrying member 10, the disc 64 can be caused to rotate at the same speed as, and at a predetermined phase angle with respect to, the eccentric 28. So that the phase relationship between the eccentric 28 and the disc 64 can be changed (which would in turn change the phase relationship between establishing a voltage between the electrode 54 and carrying member 10 and the reciprocating motion of the carrying member 10), the disc 64 has an adjustable connection, shown schematically at 78, through which it is connected to the chain and sprocket drive 80 to the output shaft 28 of the motor 26.

In operation, the wheat material to be classified is supplied through the feed chute 14 onto the carrying surface 12 of the member 10 which is reciprocated by the motor 26 through the eccentric 28. As previously described in the discussion of the operation of a conventional gravity table, this wheat material tends to stratify itself into an upper layer containing most of the foreign matter and a lower layer predominately of clean wheat. The clean wheat layer tends to migrate both forwardly and sideways toward the forward portion of the outfeed edge 48 of the carrying member 10, while the foreign matter tends to stay at the rear of the carrying member 10 and migrate therealong to the outfeed edge 48 of the carrying member 10.

The switching device 62 is so arranged with respect to the eccentric 28 that on the forward half-cycle of reciprocation of the carrying member 10, the electrode 54 is charged from the power pack 60, and an electrostatic field is created between the electrode 54 and the carrying member 10, while at the beginning of the rearward cycle of reciprocation of the carrying member 10, this charge on the electrode 54 is dissipated through the resistance 72 to eliminate this electrostatic field. The result is that during the forward half-cycle of reciprocation, the electrostatic field lifts the foreign matter proximate the electrode 54 so that the foreign particles jump over the barrier 52 to the rearward side thereof. Once these foreign particles have been lifted over this barrier 52, they remain in the passageway or trough 82 defined by the barrier 52 and the rear containing wall 46c and migrate to the outfeed edge 48 of the carrying member 10 to be collected in a rear collecting bin 50c. In actual practice, it has been found desirable to make contact with the conducting portion 66 of the disc 64 somewhat earlier than the beginning of the half-cycle of forward movement of the carrying member 10.

Extending along the forward portion of the discharge edge 48 of the carrying member 10 is a front trough 50a into which a relatively pure clean wheat fraction is deposited. Between the front bin 50a and the rear bin 50c, there is a middle bin 50b reaching forwardly from the end edge of the barrier 52, in which bin 50b a wheat fraction of lesser purity is collected, which fraction may again be recirculated over the gravity table by feeding it again into the chute 14.

It will be noted that the electrode 54 has a rearward slope of a greater angle than that of the carrying member 10, so that the distance between the electrode 54 and the carrying surface 12 decreases rearwardly. The effect of this is to make the electrostatic field between the electrode 54 and the carrying member 10 become non-uniform in a longitudinal direction, with the electrostatic field becoming progressively stronger in a rearward direction. Since particles in an electrostatic field tend to move from an area of less intensity to an area of greater intensity, the effect of so slanting the electrode 54 rearwardly is to tend to move the foreign particles rearwardly as well as upwardly, so as to help move such foreign particles over the barrier 52.

It should be understood that the foregoing is merely illustrative of a certain embodiment of the invention and many variations may be made by those skilled in the art without departing from the spirit and scope of the invention.

Now therefore, I claim:

1. An apparatus for classifying particulate material comprising a first and second fraction, said first fraction being in the operation of said apparatus more susceptible to electrostatic force as compared to said second fraction thereof, said apparatus comprising, in combination:
   (a) a carrying member presenting an upwardly disposed carrying surface for said material, said member having an infeed edge and an outfeed edge,
   (b) means for admitting material onto said member proximate the infeed edge,
   (c) said outfeed edge permitting said material to be discharged from the carrying member,
   (d) reciprocating means to move said carrying member cyclicly along a path substantially perpendicular to an axis extending from the infeed edge to the outfeed edge,
   (e) a barrier positioned on said carrying surface so as to be upstanding from said surface at a predetermined general location on said surface, and
   (f) means for cyclicly establishing an electrostatic field of a predetermined intensity at the location of said barrier only during a selected portion of each cycle of reciprocal movement of the carrying member, the lines of force of said field having a substantial component perpendicular to said carrying surface, said electrostatic field being periodically established in timed relationship with the reciprocating means and causing an electrostatic force of a predetermined intensity to be exerted on said material, so that portions of said first fraction of said material are separated from the second fraction and lifted over said barrier.

2. The apparatus as recited in claim 1, wherein said barrier moves with said carrying member, and the path of said carrying member has a substantial horizontal path component which is such that said barrier moves toward and away from said material on said carrying surface, said electrostatic field means being arranged so that said electrostatic force tends to lift particles of said first fraction while said barrier is moving toward said material on said carrying surface.

3. The apparatus as recited in claim 1, wherein said apparatus includes means which function to establish a phased force having a vertical force component which acts on said material on said carrying surface to cause a differential conveying thereof, with said first fraction following a first path over said carrying surface, and said barrier being located proximate to said first path.

4. The apparatus as recited in claim 3, wherein said moving means imparts to said carrying member a cyclic movement generally back and forth along a course having an upward and forward course component on a first half-cycle and a rearward and downward course component on a second half-cycle, whereby a first conveying action along a first component of travel is imparted to said material, with the result that when said two fractions of material are such that one fraction responds differently to said first conveying action than said other fraction, there is a differential conveying of said fractions.

5. The apparatus as recited in claim 4, wherein said conveying surface is sloped downwardly in a direction other than that of said first component of travel, so that a second conveying action along a second component of travel is imparted to said material, with the result that when said two fractions of material are such that said fractions respond differently to said second conveying action, the resultant path of one fraction over said carrying surface differs from the resultant path of the other.

6. The apparatus as recited in claim 5, wherein said carrying surface slopes in a direction opposite that of said first conveying action and also is sloped in a direction transverse to the direction of said first conveying action.

7. The apparatus as recited in claim 1, wherein said means for establishing an electrostatic field comprises an electrode located above said barrier, said electrode being sloped toward said carrying member in a direction generally the same as the horizontal direction along which said particles of said first fraction are lifted over said barrier, and said electrostatic field is thus established between said carrying member and said electrode so that said electrostatic field increases in intensity in the horizontal direction along which said particles of said first fraction are moved over said barrier.

8. The apparatus as recited in claim 1, wherein said carrying member is perforate and a fluid medium is blown upwardly through said carrying member so as to stratify said first and second fractions.

9. An apparatus for classifying particulate material into a first fraction which is more susceptible to electrostatic forces and a second fraction which is less susceptible to electrostatic forces, said apparatus comprising, in combination:
   (a) a carrying member presenting an upwardly disposed carrying surface for said material, said carrying member having a front and a rear, and an infeed side portion and an outfeed side portion,
   (b) said carrying surface being sloped downwardly in a direction both rearward and lateral toward said outfeed side,
   (c) means for admitting material onto said member proximate the infeed side,
   (d) said outfeed side permitting said material to be discharged from the carrying member,
   (e) reciprocating means to move said carrying member cyclicly along a path substantially parallel to an axis extending from the front to the rear of the member, so that said carrying member travels upwardly and forwardly along said course on a first half-cycle and downwardly and rearwardly along said course on a second half-cycle,
   (f) a barrier upstanding from said carrying surface, said barrier being located proximate the rear portion of said carrying surface and extending generally transversely thereof, said barrier moving with said carrying member along said reciprocating path,
   (g) an electrode positioned above said barrier and extending generally along the length thereof, and
   (h) means to establish cyclicly an electrostatic field between said electrode and said carrying member only during a selected portion of each cycle of reciprocal movement of said member, said electrostatic field being periodically established in timed relationship with the reciprocating means and exerting a lifting force on particles proximate said barrier during said first half cycle of reciprocation, with the result that when material is deposited on the infeed side of said carrying member and particles of said first fraction migrate toward the outfeed side of said carrying member along a path proximate said barrier, said particles of the first fraction are lifted over said barrier to the rearward side thereof.

10. The apparatus as recited in claim 9, wherein said electrode slopes rearwardly toward said carrying member, so that said electrostatic field increases in intensity in a rearward direction.

11. The apparatus as recited in claim 9, wherein said carrying surface is perforate and blowing means are provided to move a fluid medium upwardly through said carrying member so as to stratify said material on said carrying member.

12. In an apparatus for classifying particulate material, which apparatus comprises a carrying member having an upwardly disposed carrying surface for said material, said carrying member having infeed and outfeed sides and front and rear ends, and means to reciprocally move said carrying member cyclicly along a path substantially perpendicular to an axis extending from the infeed side to the outfeed side, said path having a substantial horizontal path component, said apparatus being arranged to cause a separation of said material into an upper layer of a first fraction and a lower layer of a second fraction, said first fraction being more susceptible than said second fraction to an electrostatic force having a substantial force component perpendicular to said carrying surface, said apparatus also being arranged to cause a differential conveying of said fractions, whereby said first and second fractions are each caused to follow a respective one of two general paths along said carrying surface, the improvement comprising a barrier upstanding from said carrying surface proximate the rear end, said barrier extending proximate to the general path followed by said first fraction, and means for cyclicly establishing an electrostatic field of a predetermined intensity proximate to said barrier and to said path of said first fraction only during a selected portion of each cycle of reciprocal movement of the carrying member, the lines of force of said field having a substantial component perpendicular to said carrying surface, said electrostatic field being established in timed relationship with the reciprocating means and causing an electrostatic force of a predetermined intensity to be exerted on said material, so that particles of said first fraction are lifted over said barrier.

13. The improvement as recited in claim 12, wherein said means comprises an electrode positioned above said barrier, and means to charge said electrode in timed relationship with movement of said carrying member.

14. The improvement as recited in claim 13, wherein said barrier moves with said carrying member toward and away from said material and said means establishes said electrostatic field as said barrier moves toward said material.

15. A process for classifying particulate material, which material comprises a first and second fraction, said first fraction being in the operation of said process more susceptible to electrostatic force as compared to said second fraction, said process comprising:
(a) depositing said material to be classified onto a carrying surface of a carrying member, said carrying member having infeed and outfeed sides, front and rear ends, and a barrier upstanding from said carrying surface at a predetermined location thereon,
(b) reciprocally moving said carrying member cyclicly along a path which is substantially perpendicular to an axis extending from the infeed side to the outfeed side, and
(c) cyclicly establishing an electrostatic field of a predetermined intensity at the location of said barrier only during a selected portion of each cycle of reciprocal movement of the carrying member, the lines of force of said field having a substantial component perpendicular to said carrying surface, said electrostatic field being established in timed relationship with the reciprocating means and causing an electrostatic force of a predetermined intensity to be exerted on said material, so that portions of said first fraction of material are lifted over said barrier so as to be separated from said second fraction.

16. The process as recited in claim 15, wherein said barrier is moved with said carrying member, and said carrying member is moved along a path having a substantial horizontal path component which is such that said barrier moves toward and away from said material on said carrying surface, and said electrostatic field is established so as to lift said particles of said first fraction while said barrier is moved toward said material on the carrying surface.

17. A process for classifying particulate material into a first fraction which in the operation of said process is more susceptible to electrostatic force and a second which is less susceptible to electrostatic force, said process comprising:
(a) placing said material on a carrying surface of a carrying member, said carrying member having infeed and outfeed sides, and front and rear ends, said carrying surface having a downward slope in a predetermined direction,
(b) moving said carrying member cyclicly along a generally reciprocating course which is substantially perpendicular to an axis extending from the infeed side to the outfeed side, so that said carrying member travels upwardly and forwardly along said course on a first half-cycle and downwardly and rearwardly along said course on a second half-cycle with the result that there is a first conveying action generally in the direction in which said member moves on its first half-cycle and a second conveying action generally in the direction of said downward slope, with the result that said first fraction follows a resultant first path along said carrying member different from a resultant second path of said second fraction along said carrying member, said first path being proximate to a barrier upstanding from said carrying surface, and
(c) periodically electrostatically charging an electrode positioned above the carrying member so that an electrostatic field of a predetermined intensity is established at the location of said barrier only during a selected portion of each cycle of reciprocal movement of the carrying member, said field being established in timed relationship with the reciprocating movement of said carrying member so that particles of said first fraction are lifted over said barrier during predetermined intervals.

18. The process as recited in claim 17, wherein said electrostatic field is established largely during said first half-cycle.

References Cited by the Examiner
UNITED STATES PATENTS

| | | | |
|---|---|---|---|
| 1,375,741 | 4/1921 | Sutton | 209—127 |
| 2,699,869 | 1/1955 | Gear | 209—127 |

FRANK W. LUTTER, *Primary Examiner.*